United States Patent [19]
Lawson et al.

[11] Patent Number: 5,153,271
[45] Date of Patent: Oct. 6, 1992

[54] DIENE POLYMERS AND COPOLYMERS TERMINATED BY REACTION WITH AROMATIC NITRILES

[75] Inventors: David F. Lawson, Uniontown; Mark L. Stayer, Jr., Mogadore; Thomas A. Antkowiak, Wadsworth, all of Ohio

[73] Assignee: Bridgestone/Firestone, Inc., Akron, Ohio

[21] Appl. No.: 794,082

[22] Filed: Nov. 18, 1991

[51] Int. Cl.$^5$ ............................................... C08F 8/30
[52] U.S. Cl. ............................ 525/332.8; 525/332.9; 525/333.1; 525/333.2; 525/377
[58] Field of Search ............... 525/332.8, 332.9, 333.1, 525/333.2, 377

[56] References Cited

U.S. PATENT DOCUMENTS

| | | | |
|---|---|---|---|
| 4,383,085 | 5/1983 | Fujimaki | 525/199 |
| 4,515,922 | 5/1985 | Sakakibara et al. | 525/99 |
| 4,816,520 | 3/1989 | Bronstert | 525/285 |
| 4,835,209 | 5/1989 | Kitagawa et al. | 524/507 |
| 4,927,887 | 5/1990 | Tate et al. | 525/279 |
| 4,935,471 | 6/1990 | Halasa et al. | 525/359.1 |
| 5,017,636 | 5/1991 | Hattori et al. | 524/300 |

*Primary Examiner*—Bernard Lipman
*Attorney, Agent, or Firm*—Frank J. Troy, Sr.

[57] ABSTRACT

A terminally functionalized polymer is prepared by reacting a living polymer obtained by anionic polymerization of a diene monomer or mixture of a diene monomer and a vinyl aromatic hydrocarbon monomer with an aromatic nitrile compound. Especially useful aromatic nitriles are the unsubstituted and substituted benzonitriles. The resultant terminally functionalized polymers have reduced hysteresis in the carbon black reinforced and cured state and can be utilized to form elastomer compositions for tire treads having reduced rolling resistance.

13 Claims, No Drawings

DIENE POLYMERS AND COPOLYMERS TERMINATED BY REACTION WITH AROMATIC NITRILES

BACKGROUND OF THE INVENTION

The invention relates to terminally functionalized diene polymers and copolymers having reduced hysteresis in the carbon black reinforced and cured state. More particularly, the invention relates to diene polymers and copolymers containing terminals derived from aromatic nitrile compounds which can be utilized to form elastomer compositions for tire treads having reduced rolling resistance and good traction.

In recent years, those active in the tire industry have greatly increased their emphasis on the development of tires having both reduced rolling resistance and good wet traction properties. As is well known, that portion of the tire which exerts the greatest influence on rolling resistance and traction is the tread or tread rubber portion. Low rolling resistance is desirable from a fuel consumption standpoint while good wet traction is desirable from a safety standpoint. However, as a general rule, these properties have been found to conflict with each other. Thus, a reduction in rolling resistance generally leads to an almost directionally proportional reduction in wet traction while an increase in wet traction generally leads to an almost directionally proportional increase in rolling resistance.

The prior art has proposed a number of approaches to the solution of this problem. Such approaches have generally involved modifying the properties of the elastomer or elastomer composition utilized to form the tire tread in order to achieve the best possible balance between rolling resistance and traction. The approaches involving modification of the elastomer have generally been based on improving the interaction between the elastomer and the carbon black used in compounding the elastomer to prepare the tire tread composition in order to improve the dispersion of the carbon black into the elastomer. This has the effect of reducing the hysteresis of the tire tread composition which in turn results in low rolling resistance.

One known approach to modifying the diene polymer or copolymer elastomer to reduce the hysteresis of elastomer compositions formed therefrom involves coupling the living diene polymer or copolymer chains with metal halides. Thus, U.S. Pat. Nos. 4,383,085 and 4,515,922 describe the coupling of living diene polymer or copolymer chains obtained by anionic polymerization using an organolithium initiator with metal halides such as tin halides, silicon halides and the like. These patents indicate that tire treads formed from rubber compositions containing the coupled polymers have reduced hysteresis along with reduced rolling resistance and improved wet skid resistance.

Another known approach to modifying the diene polymer or copolymer elastomer to reduce the hysteresis of elastomer compositions involves terminating the living diene polymer or copolymer chains with certain compounds containing functional groups which are reactive with the lithium terminals of the living polymer as illustrated by the following patents:

U.S. Pat. No. 4,835,209 discloses the termination of living diene polymer or copolymer chains with carbodiimides. The patent discloses that rubber compositions containing such polymers have excellent performance characteristics with respect to tensile strength, impact resistance, low heat-generating properties and wear resistance without impairing wet skid properties.

U.S. Pat. No. 4,816,520 relates to terminally functionalized polymers, including diene polymers and copolymers and a process for their preparation. The reference discloses that the terminally functionalized polymers are prepared from living polymers obtained by anionic polymerization of olefinically unsaturated monomers by first reacting the living polymers with capping reagents comprising various nitrogen compounds including substituted imines (Schiff bases) and diaziridines and then reacting the capped polymer with a terminating agent which contains halogen or acid anhydride groups. Capping reagents which are disclosed include among others a compound of the formula

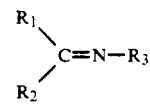

wherein $R_1$ is H, alkyl, cycloalkyl or aryl and $R_2$ and $R_3$ are each alkyl, cycloalkyl or aryl. Terminating agents which are disclosed include halogen compounds such as chloromethylstyrenes, acryloyl chloride, methacryloyl chloride, epichlorohydrin, etc.

U.S. Pat. No. 4,935,471 discloses the termination of living diene polymer or copolymer chains with a capping agent selected from the group consisting of (a) halogenated nitriles having the structural formula $X-A-C\equiv N$ wherein X is a halogen atom and A is an alkylene group of 1 to 20 carbon atoms, (b) heterocyclic aromatic nitrogen-containing compounds, and (c) alkyl benzoates. The only halogenated nitrile compound specifically disclosed is chloroacetonitrile. This patent discloses that compositions containing such polymers have reduced hysteresis and the tire treads made from such compositions have lower rolling resistance and better traction characteristics.

SUMMARY OF THE INVENTION

In accordance with the present invention, diene polymers and copolymers containing terminals derived from aromatic nitrile compounds are provided. The polymers are prepared by reacting a living polymer obtained by anionic polymerization of a diene monomer or mixture of a diene monomer and a vinyl aromatic hydrocarbon monomer with an aromatic nitrile compound selected from the group consisting of unsubstituted and substituted benzonitriles. The resultant terminally functionalized polymers have reduced hysteresis properties in the carbon black reinforced and cured state and can be utilized to form elastomer compositions for tire treads having reduced rolling resistance.

DETAILED DESCRIPTION OF THE INVENTION

The term "living polymer" as employed throughout the specification and claims refers to polymers which are prepared by anionic polymerization of a diene monomer or mixture of a diene monomer and a vinyl aromatic hydrocarbon monomer using an initiator such as an organolithium compound. The resultant polymer contains active terminals (e.g. lithium terminals) which can be subjected to terminating reactions.

The term "hysteresis" as employed throughout the specification refers to the heat generating properties of a vulcanized elastomer or rubber composition. An art recognized measurement of the hysteresis of an elastomer composition is the tan delta value of the vulcanized composition. Low tan delta values at 50° to 65° C. are indicative of low hysteresis and, consequently, tires formed from such elastomer compositions have lower rolling resistance.

The diene polymers or copolymers of the invention are prepared by a process which involves first preparing a living diene polymer or copolymer containing active organoalkali or organoalkaline earth metal terminals by anionic polymerization of a conjugated diene monomer or mixture of a conjugated diene monomer and a vinyl aromatic hydrocarbon monomer then terminating the living diene polymer or copolymer chains by reacting the active terminals thereof with an aromatic nitrile compound. The living diene polymer is a polymer of a conjugated diene and the living diene copolymer is a random copolymer of a conjugated diene and a vinyl aromatic hydrocarbon.

Conjugated dienes which may be utilized in preparing the living polymers and copolymers include 1, 3-butadiene, 2-methyl-1, 3-butadiene (isoprene), 2,3-dimethyl-1, 3-butadiene, 1,3-pentadiene, 1,3-hexadiene and the like as well as mixtures thereof. The preferred diene is 1,3-butadiene.

Vinyl aromatic hydrocarbons which may be utilized in preparing the living copolymers include styrene, vinyl toluene, alpha-methyl styrene, vinyl naphthalene, vinyl pyridine and the like. The preferred vinyl aromatic hydrocarbon is styrene.

The living polymer can be prepared in a well known manner by polymerizing the monomer or monomers in a hydrocarbon solvent in the presence of an anionic initiator. In instances where it is desired to control the 1,2-microstructure of the diene polymer of copolymer and to effect randomization of the copolymer, this can readily be accomplished by including an appropriate polar modifier such as an ether or a tertiary amine in the polymerization mixture.

Anionic initiators which may be utilized in the preparation of the living polymers and copolymers may be any of the organoalkali metal initiators known in the art to be useful for the preparation of diene polymers and copolymers. The preferred initiators are organolithium initiators, especially the alkyllithium initiators. Suitable organolithium initiators which may be utilized include ethyllithium, n-butyllithium, tetramethylene dilithium, hexyllithium, cyclohexyl lithium, phenyllithium, tolyllithium and the like. A particularly preferred initiator is n-butyllithium.

It is also possible to employ as the anionic initiator an initiator formed by reacting a functionalizing agent with the above-described organolithium initiators. Thus, such initiators can be formed by reacting a functionalizing agent selected from the group consisting of substituted aldimines, ketimines and secondary amines with the organolithium compound. For example, an anionic initiator of this type can be formed by reacting a substituted aldimine such as dimethylamino benzylidene methylamine with n-butyllithium. A number of initiators of this type are described in our pending U.S. application Ser. No. 506,306 to Antkowiak et. al. filed Apr. 9, 1990, the disclosure of which is incorporated herein by reference.

Hydrocarbon solvents which may be employed in the preparation of the living polymers and copolymers include aromatic and aliphatic hydrocarbons in which the monomers, initiator and modifier are soluble. Suitable hydrocarbon solvents include hexane, heptane, pentane, octane, cyclohexane, cycloheptane, cyclopentane, methyl cyclohexane, benzene and toluene. The preferred hydrocarbon solvents are hexane and cyclohexane.

Polar modifiers which may be utilized to control the 1,2-microstructure content of the living diene polymers or copolymers and to effect randomization of the copolymers may be any of those heretofore known in the diene polymer or copolymer art to be useful for that purpose. Suitable polar modifiers include ethers such as tetrahydrofuran (THF), tetrahydropyran, 1,4-dixoane, monoglycol methyl ether (monoglyme), diglycol methyl ether (diglyme), triglycol methyl ether (triglyme) and the oligomeric oxolanyl alkane compounds described in U.S. Pat. No. 4,429,091 such as bis (2-oxolanyl) methane; 2,2-bis (2-oxolanyl) propane; 1,1-bis (2-oxolanyl) ethane; 2,2-bis (5-methyl-2-oxolanyl) propane and the like and tertiary amine compounds such as triethyl amine, tripropyl amine, tributyl amine, N,N,N'-tetramethylethylene diamine (TMEDA), dipiperidino ethane, and the like. The preferred polar modifiers are TMEDA and the oligomeric oxolanyl propanes.

The living random copolymers of conjugated dienes and vinyl aromatic hydrocarbons utilized to prepare copolymers of the invention may have diene contents of from about 99 to 20 percent by weight and vinyl aromatic hydrocarbon contents of from about 1 to about 80 percent by weight with the preferred copolymers having diene contents of from 90 to 50 percent by weight and vinyl aromatic hydrocarbon contents of from 10 to 50 percent by weight.

The living polymers of conjugated dienes and random copolymers of conjugated dienes and vinyl aromatic hydrocarbons employed to prepare the polymers and copolymers of the invention may have 1,2-microstructure contents ranging from about 10 to about 80 percent with the preferred polymers or copolymers having 1,2-microstructure contents of from 15 to 65 percent. The preparation of diene polymers or copolymers having a particular 1,2-microstructure content is dependent on a number of factors including the specific initiator, the type polar modifier, the modifier to initiator ratio and the polymerization temperature.

Illustrative methods of preparing diene polymers and copolymers having 1,2-microstructure contents ranging from 15 to 90 percent or more are described in numerous patents and publications including U.S. Pat. Nos. 3,451,988 and 4,264,753; and the publication "Temperature and Concentration Effects on Polar-Modifier Alkyllithium Polymerizations and Copolymerization", Journal of Polymer Science, Part A-1, Vol. 10, pages 1319-1334 (1972); the disclosures of which are incorporated herein by reference.

One of ordinary skill in the polymerization arts can, by utilizing the disclosures of the incorporated patents and publication, readily determine the type initiator, the type polar modifier, the necessary modifier-initiator ratio and polymerization conditions necessary to obtain a living diene polymer or copolymer having the desired 1,2-microstructure content.

The terminally functionalized polymers of the invention are prepared by reacting the above living polymers, preferably in solution in the hydrocarbon solvent in which they were prepared, with the aromatic nitrile compound. Aromatic nitrile compounds which may be employed include unsubstituted and substituted benzonitriles such as benzonitrile, o, m, and p-tolunitrile, 2-methoxybenzonitrile, 3-methoxybenzonitrile, 4-methoxybenzonitrile and N,N-(dialkylamino)benzonitriles such as N,N-dimethylaminobenzonitrile, N,N-diethylaminobenzonitrile, N,N-dibutylaminobenzonitrile, N,N-dihexylaminobenzonitrile, N,N-dioctylaminolbenzonitrile, 4-pyrrolidinobenzonitrile, 5-cyano-1-methylindole, and the like. The preferred aromatic nitrile compound is benzonitrile.

The reaction of the living polymer in solution with the terminating agent can be conducted if desired by simply adding the terminating agent per se to the polymer solution. However, it is generally preferred to add the terminating agent in the form of a solution thereof in an appropriate solvent for ease of handling.

The amounts of terminating agent added to the living polymer are dependent upon the amounts of live organoalkali metal end groups (e.g. live lithium end groups) present in the living polymer and the amounts of terminating agent desired in the finished polymer. It will be noted that the number of moles of live alkali metal end groups in the living polymer is presumed to be equivalent to the number of moles of alkali metal groups present in the organoalkali metal initiator utilized to effect polymerization. In general, the amount of terminating agent employed to react with the live alkali metal groups of the living polymer herein may range from less than stoichiometric, i.e. 0.75 moles of terminating agent per mole of live alkali metal end groups, to stoichiometric, i.e. about 1 mole of terminating agent per mole of live alkali metal end groups, to a large excess of terminating agent. However, from about 0.9 to 2.0 moles of terminating agent per mole of alkali metal end groups is preferred.

Temperatures employed in reacting the living polymer with the terminating agent may vary considerably and are selected with the basic criteria of preserving the live alkali metal end groups of the living polymer for reaction with the terminating agents. Thus, the reaction temperatures may range from about 0° C. to about 100° C. with the preferred temperatures ranging from 30° C. to 100° C. and especially preferred temperatures ranging from 50° C. to 80° C. The reaction times may also vary considerably and are, in general, dependent upon reaction temperatures. Hence, the reaction times may range from about 15 minutes to about 24 hours.

After the terminating reaction is complete, it is generally desirable to quench the polymer mixture in order to deactivate any live alkali metal end groups (e.g. lithium end groups) which may remain. This serves to prevent the living polymer from reacting with any carbon dioxide or oxygen which may be present. The quenching reaction can be conducted in known manner by adding a conventional polymer terminating agent such as water or an alcohol (e.g. isopropanol) to the polymer solution.

The resultant terminally functionalized polymer can be recovered from the polymer solution and dried using conventional procedures. Thus, for example, the polymer can be recovered from solution by direct drum drying, extruder drying, air drying or by coagulation either by adding a sufficient volume of a non-solvent liquid (e.g. an alcohol) for the polymer to the solution or, alternatively, by adding the polymer solution to a sufficient volume of the non-solvent. It is usually desirable in carrying out the coagulation procedure to include an appropriate antioxidant for the polymer in the non-solvent. The recovered polymer can then be dried using a conventional polymer drying procedure such as drum drying, vacuum drying, extruder drying, tunnel drying, oven drying and the like.

Elastomer compositions of the invention can be prepared by compounding or mixing the terminally functionalized polymers herein with carbon black and other conventional rubber additives such as fillers, plasticizers, antioxidants, curing agents and the like using standard rubber mixing equipment and procedures. Such elastomer compositions when vulcanized using conventional rubber vulcanization conditions have reduced hysteresis properties and ar particularly adapted for use as tread rubbers for tires having reduced rolling resistance.

The following examples are submitted for the purpose of further illustrating the nature of the present invention and should not be regarded as a limitation on the scope thereof. Parts and percentages shown in the examples are by weight unless otherwise indicated.

EXAMPLES 1-2

These examples illustrate the preparation of diene copolymers and tread rubber compounds of the invention.

(A) Preparation of Living Copolymer Base

A "living" medium vinyl random butadiene/styrene copolymer was prepared in accordance with the following procedure:

To a stainless steel 5 gallon reactor equipped with a stirrer and thermometer and maintained under a nitrogen atmosphere was charged 687.1 grams (6.6 moles) of styrene, 2125.9 grams (39.37 moles) of 1,3-butadiene, 21.8 lbs of hexane, 4.6 millimoles (hereinafter abbreviated as mM) of 2,2-bis (2-oxolanyl) propane modifier and 23.1mM of n-butyllithium initiator. After adding the initiator, the stirred reactor was heated to 113°-122° F. for 5 hours and then allowed to cool to 87° F. with stirring overnight, all under positive nitrogen pressure.

A sample of the resultant living copolymer was quenched with isopropanol and drum dried to serve as a control for the terminally functionalized copolymers of Examples 1 and 2 Samples of the quenched copolymer were tested for Mooney Viscosity, ML/4/100° C., and analyzed by GPC, HNMR and DSC to determine molecular weight (Mw and Mn), molecular weight distribution (Mw/Mn), microstructure, styrene content and glass transition temperature (Tg). Results were as follows:

| HSGPC(THF): | Mn = 152,688 | Tg = −46.2° C. |
|---|---|---|
| | Mw = 172,035 | |
| | Mw/Mn = 1.13 | |

NMR: Styrene=25.3%.
Vinyl content=35.1% (based on butadiene=100).
ML/4/100° C.=45.

(B) Preparation of Terminally Functionalized Copolymers

Samples of the living copolymer solution prepared in step (A) were injected into 28 ounce glass bottles sealed with a rubber septum and under nitrogen purge by means of a hypodermic syringe in order to avoid exposing the living copolymer to the atmosphere. Certain of the living copolymer samples were reacted with benzonitrile (Example 1) while other living copolymer samples were reacted with 4-(N,N-dimethylamino) benzonitrile (Example 2) using the following procedures:

EXAMPLE 1

0.91 ml and 0.93 ml respectively of a 0.72M solution of anhydrous benzonitrile (stored over molecular sieves) were injected using a hypodermic syringe into two 28 ounce glass bottles containing 394 grams and 402 grams respectively of the living SBR-Li copolymer solution. The amounts of benzonitrile added represent an approximately 20% molar excess of benzonitrile to lithium. The contents of the bottle were agitated at 50° C. for 5 hours and then allowed to stand for 19 hours. The resultant copolymers were then quenched by injection with 1.5 ml of isopropanol, treated with an antioxidant, coagulated in isopropanol, air-dried at room temperature and vacuum-dried at 60° C. to constant weight.

Samples of the resultant copolymer were tested for Mooney Viscosity and analyzed for molecular weight, molecular weight distribution, microstructure and glass transition temperature as set forth in step (A). The copolymer had basically the same microstructure and approximately the same Tg as the copolymer base. The remaining properties were as follows:

| HSGPC(THF): | Mn = 158,000 |
|---|---|
| | Mw = 209,911 |
| | Mw/Mn = 1.33 |

ML/4/100° C = 52.

EXAMPLE 2

3.7 ml each of a 0.18M solution of unpurified 4-(N,N-dimethylamino) benzonitrile in toluene (stored over molecular sieves) were injected using a hypodermic syringe into two 28 ounce glass bottles each containing approximately 400 grams of living SBR-Li copolymer solution. The amounts of nitrile added represented an approximately 20% molar excess of nitrile to lithium. The contents of the bottles were agitated at room temperature for 24 hours, then quenched by injection of 1.5 ml of isopropanol, treated with an antioxidant, coagulated in isopropanol, air-dried at room temperature and vacuum-dried at 60° C. to constant weight.

Samples of the resultant copolymer were tested for Mooney viscosity and analyzed for molecular weight, molecular weight distribution, microstructure and glass transition temperature as in Example 1. The copolymer had basically the same microstructure and approximately the same Tg as the copolymer base. The remaining properties were as follows:

| HSGPC: | Mn = 153,323 |
|---|---|
| | Mw = 232,651 |
| | Mw/Mn = 1.52 |

(C) Preparation of Tread Rubber Compounds

Samples of the control copolymer and the copolymers of Examples 1 and 2 were compounded with carbon black and conventional rubber additives using a standard tread rubber formulation. The standard tread rubber compound had the following formulation:

| | Parts by Weight |
|---|---|
| Copolymer | 100.0 |
| Carbon Black | 55.0 |
| Process Oil | 10.0 |
| Zinc Oxide | 3.0 |
| Stearic Acid | 2.0 |
| Antioxidant | 1.0 |
| Wax | 2.0 |
| Sulfur | 1.5 |
| Accelerator | 1.0 |

The rubber compounds were mixed using conventional rubber mixing equipment and procedures. Samples of the resultant tread rubber compounds were tested for Mooney Viscosity (ML/4/100° C.). Samples of tread rubber compounds were cured as 3"×6"×0.040" plaques for 35 minutes at 149° C. and cut into rings for stress-strain tests. Additional samples of compounds were cured for 40 minutes at 149° C. and tested for hysteresis (Tan delta) properties. Tan delta (hereinafter Tan δ) was determined at 50° C. using a Dynasty machine operating at a frequency of 1 Herz and 7% strain. Tan δ is a measure of the ratio of the loss modulus of the compound to the storage modulus and generally, as indicated above, the lower the value of Tan δ, the lower the hysteresis of the compound. Test and test results are shown in Table I:

TABLE I

| Copolymer Ex. | Control | 1 | 2 |
|---|---|---|---|
| Terminator | isopropanol | benzonitrile | 4-(N,N-dimethylamino) benzonitrile |
| Compound Properties | | | |
| Mooney Viscosity (ML/4/100° C.) | 85.8 | 101.5 | 107.8 |
| Tan δ, 50° C. | 0.1297 | 0.0890 | 0.0766 |
| % Δ. Tan δ* | — | −31.4 | −40.9 |
| Stress-strain, R.T. | | | |
| 300% modulus, psi | 2125 | 2165 | 2129 |
| Tensile, psi | 3192 | 2860 | 2993 |
| Elongation at break, % | 427 | 372 | 392 |

* = % change in Tan δ (minus values indicate reduction in Tan δ)

These results show greatly reduced Tan δ, indicative of reduced hysteresis, for the copolymers of Examples 1 and 2 as compared to the control copolymer where there was no end group termination.

We claim:

1. A terminally functionalized polymer prepared by reacting a living polymer obtained by anionic polymerization of a diene monomer or a mixture of a diene monomer and a vinyl aromatic hydrocarbon monomer with an aromatic nitrile compound selected from the group consisting of unsubstituted and substituted benzonitriles.

2. The terminally functionalized polymer of claim 1 wherein said terminally functionalized polymer is a polymer of butadiene or a copolymer of butadiene and styrene.

3. The terminally functionalized polymer of claim 1 wherein the terminal functional group is formed by reacting the living polymer with unsubstituted and substituted benzonitriles selected from the group consisting of benzonitrile, o, m and p-tolunitrile, 2-methoxybenzonitrile, 3-methoxybenzonitrile, 4-methoxybenzonitrile and N,N-(dialkylamino) benzonitriles.

4. The terminally functionalized polymer of claim 1 wherein the terminal functional group is formed by reacting the living polymer with benzonitrile.

5. A process for preparing a terminally functionalized polymer from a living polymer obtained by anionic polymerization of a diene monomer or mixture of a diene monomer and a vinyl aromatic hydrocarbon monomer which comprises reacting the living polymer with an aromatic nitrile compound selected from the group consisting of unsubstituted and substituted benzonitriles.

6. The process of claim 5 wherein said living polymer is a living polymer of butadiene or a copolymer of butadiene and styrene.

7. The process of claim 5 wherein said aromatic nitrile compound is selected from the group consisting of benzonitrile, o, m, and p-tolunitrile, 2-methoxybenzonitrile, 3-methoxybenzonitrile, 4-methoxybenzonitrile and N,N-(dialkylamino) benzonitriles.

8. The process of claim 5 wherein said aromatic nitrile compound is benzonitrile.

9. The process of claim 5 wherein said terminally functionalized polymer is a terminally functionalized polymer of butadiene or a copolymer of butadiene and styrene.

10. An elastomer composition adapted for use in forming the treads of tires having reduced rolling resistance which comprises a terminally functionalized elastomeric polymer and rubber additives, wherein said terminally functionalized polymer is prepared by reacting a living polymer obtained by anionic polymerization of a diene monomer or mixture of a diene monomer and a vinyl aromatic hydrocarbon monomer with an aromatic nitrile compound selected from the group consisting of unsubstituted and substituted benzonitriles.

11. The elastomer composition of claim 10 wherein said terminally functionalized polymer is a polymer of butadiene or a copolymer of butadiene and styrene.

12. The elastomer composition of claim 10 wherein the terminal functional group of said terminally functionalized polymer is formed by reacting the living polymer with an aromatic nitrile compound selected from the group consisting of benzonitrile, o, m, and p-tolunitrile, 2-methoxybenzonitrile, 3-methoxybenzonitrile, 4-methoxybenzonitrile and N,N-(dialkylamino) benzonitriles.

13. The elastomer composition of claim 10 wherein the terminal functional group of said terminally functionalized polymer is formed by reacting the living polymer with benzonitrile.

* * * * *